(No Model.)
P. PERSON.
BICYCLE SUPPORT.
No. 606,578. Patented June 28, 1898.
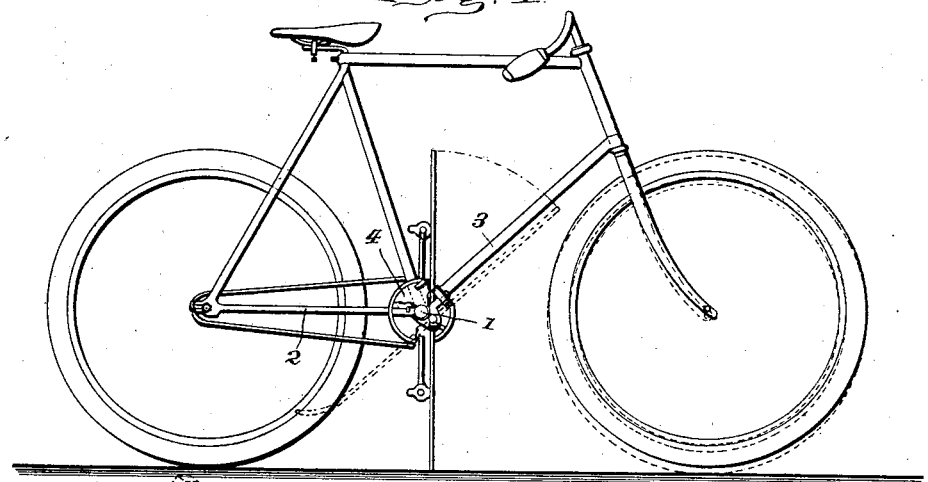
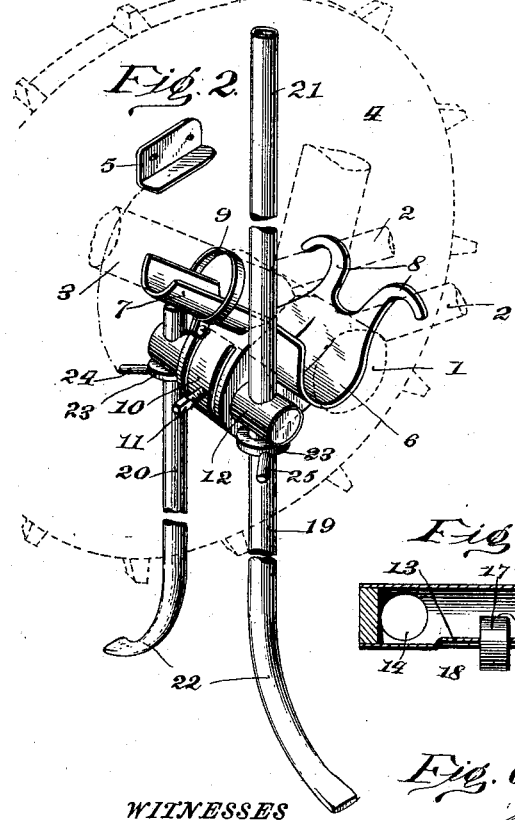
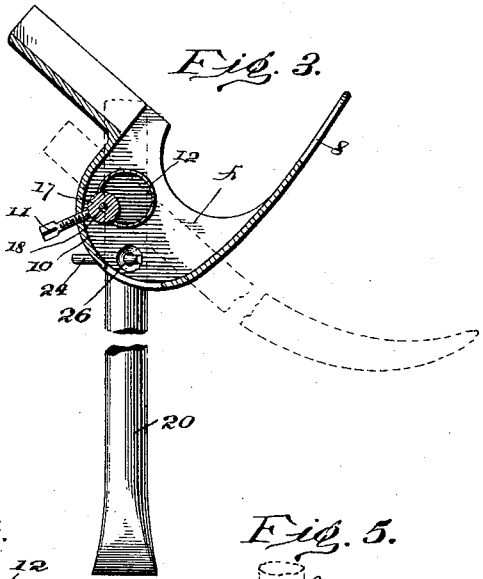
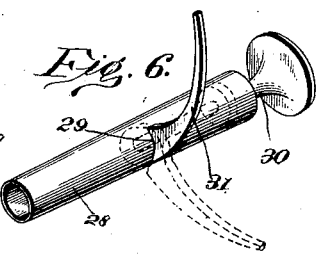
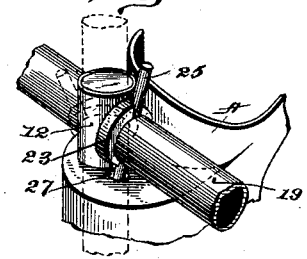
WITNESSES
Theo. L. Gatchel
Wm. M. Mason
INVENTOR
Paul Person
by John Wedderburn
Attorney

UNITED STATES PATENT OFFICE.

PAUL PERSON, OF STOCKTON, CALIFORNIA.

BICYCLE-SUPPORT.

SPECIFICATION forming part of Letters Patent No. 606,578, dated June 28, 1898.

Application filed August 7, 1896. Serial No. 602,046. (No model.)

*To all whom it may concern:*

Be it known that I, PAUL PERSON, a citizen of the United States, residing at Stockton, in the county of San Joaquin and State of California, have invented certain new and useful Improvements in Bicycle-Supports; and I do hereby declare the following to be a full, clear, and exact description of the invention, such as will enable others skilled in the art to which it appertains to make and use the same.

My invention relates to bicycle-supports.

My object is to provide a bicycle-support of cheap and simple construction which may be readily connected to or disconnected from an ordinary bicycle and which when not in use will be out of the rider's way, but ready for quick and easy manipulation to be thrown into action to support the bicycle.

To this end the invention consists in a bicycle-support embodying certain novel features and details of construction and arrangement of parts, as hereinafter fully set forth, illustrated in the drawings, and incorporated in the claims.

In the accompanying drawings, Figure 1 is a side elevation of a bicycle equipped with my improved support, the latter being shown in folded and supporting positions, respectively; Fig. 2, a perspective view of the support detached from the bicycle, the drive-sprocket being shown in dotted lines, the cam in full lines, and the legs being shown in supporting position; Fig. 3, a longitudinal section of the support; Fig. 4, a detail of the rotatable shaft of the support, showing the friction-roller and its spindle. Fig. 5 is a detail view showing certain parts, and Fig. 6 a detail of an attachment sometimes employed.

The numeral 1 designates the crank-hanger, 2 the members of the rear fork, and 3 the lower-line tube of the bicycle-frame.

The numeral 4 designates the drive-sprocket, to the inner face of which is connected an inclined cam 5.

A designates the casing or housing, which forms the body of my improved bicycle-support. This casing has a portion 6, which receives the crank-hanger, another portion 7, which fits the lower-line tube, and two rear horns 8, which hook over the members of the rear fork. A spring-clip 9 encircles the portion 7 and the lower-line tube, and together with the housing holds the casing or housing firmly in position. The entire casing or housing is preferably constructed of steel and its lower depending portion is provided with two parallel slits, thereby forming a curved spring 10, which has its end joined to the casing. A set-screw 11 passes through this spring. A short shaft 12 passes through the depending portion of the casing or housing, being journaled therein and preferably constructed of steel tubing. That portion of this shaft which lies within the casing is provided with a longitudinal depression 13 and with two apertures 14 and 15. The shaft is also cut away transversely, as at 16, and this transverse cut intersects the longitudinal depression.

The numeral 17 designates a friction-roller which is journaled on a stationary spindle 18, which lies in the longitudinal depression 13 of the shaft 12. About half of the friction-roller projects through the transverse cut 16 into the shaft. This friction-roller bears on the spring 10 and set-screw 11.

There are two supporting-legs 19 and 20, and one of these legs is extended, as at 21, to form a handle. The lower ends of the legs are provided with curved feet 22. These legs are preferably constructed of steel tubing, and they are passed through and journaled in the respective ends of shaft 12, which project from the sides of the casing. On each leg there is located a collar 23, which is situated at the rear of the shaft 12.

The numerals 24 and 25 designate pivoted screws which pass through the legs to the rear of the collars and have their blank tips projecting into apertures 26 and 27 in the sides of the casing. The outer end of the pivoted screw 24 lies in the path of the cam 5.

If desirable, the attachment shown in Fig. 6 could be employed in connection with the handle 21, and with its use the spring locking mechanism and friction-roller might be dispensed with. This attachment consists of a tapering piece of tubing 28, provided with a transversely-extending slot 29, a spindle 30, provided with a thumb-knob at its upper end, and a curved finger 31, which is connected to the spindle. The smaller end of this piece of tubing is inserted in the end of the handle 21, and when thus arranged the thumb-knob can be turned and the finger thrown under the lower-line tube when it is desired to hold the support in horizontal position.

The operation is as follows: When the legs are folded, as when the bicycle is in use, the feet diverge upwardly slightly and straddle the rear wheel. When it is desired to have the bicycle supported, the handle portion of one of the legs is raised, whereupon shaft 12 turns until the friction-roller has ridden over the end of set-screw 11. During this operation the engagement of the blank ends of the pivoted screws with the casing has caused the legs to turn, so that the feet are spread outward, and when the feet come in engagement with the floor or ground the bicycle is firmly supported with the front wheel raised slightly above the surface of the floor or ground. When the rider again mounts and begins to pedal, the revolution of the sprocket-wheel brings the cam into engagement with the outer end of pivot-screw 24 and forces the legs backward from the floor with the assistance of the spring, which holds them again. The rider may now proceed on his journey.

It is to be understood that I do not limit myself to the precise construction herewith shown and described, but consider that I am entitled to all such variations as may come within the scope of the invention.

Having now described my invention, what I claim as new, and desire to secure by Letters Patent, is—

1. In a bicycle-support, the combination with a rotatable shaft, of supporting-legs having feet journaled in said shaft so as to be adapted to turn on their longitudinal axes, pins projecting from the said legs, engaging devices adapted to contact with the ends of the pins, and means for holding the legs in supporting position, said parts being so disposed and related that the engaging devices actuate the pins and turn the legs on their longitudinal axes when said legs are moved to supporting position, whereby the feet of said legs are spread.

2. In a bicycle-support, the combination with a casing or housing connected to the bicycle, of a shaft journaled in said casing or housing, legs provided with feet and journaled in the shaft so that they may turn on their longitudinal axes, pivoted pins passing through the legs and loosely into the casing, said legs being normally held in raised position, but adapted for rotation with the shaft and for turning on their longitudinal axes to spread their feet when thrown around to support the bicycle, and means for holding said legs in supporting position.

3. In a bicycle-support, the combination with a casing or housing connected to the bicycle, of a shaft rotatably mounted in the casing, legs provided with feet and normally held in raised position, said legs being journaled in the shaft so that they may turn on their longitudinal axes, collars on the legs to prevent them from sliding in the shaft, pivoted screws passing through the legs and loosely into the casing, said parts being so disposed and related that when the legs and shaft are turned to bring the former to supporting position, the engagement of the pivot-screws with the casing will cause the legs to turn on their longitudinal axes thereby spreading their feet, and means for holding said legs in supporting position.

4. In a bicycle-support, the combination with a casing or housing connected to the bicycle, of a spring connected to said casing or housing and provided with a pin, a shaft journaled in the casing and provided with a friction-roller adapted to ride on the spring and abut on the pin, and supporting-legs connected to the shaft and normally held in raised position by the engagement of the spring and friction-roller, said supporting-legs being adapted to be lowered to support the bicycle and when so lowered be held locked by the engagement of the friction-roller with the pin.

5. In a bicycle-support, the combination with a casing or housing adapted for attachment to the bicycle, of a spring connected to the casing and provided with a pin, a shaft journaled in the casing and provided with a friction-roller adapted to ride on the spring and to lock with the pin, legs journaled in the shaft and provided with feet, and pivot-pins connected to the legs and projecting loosely into the casing, said parts being so disposed and related that the spring normally holds the legs in raised position, but when said legs are lowered to support the bicycle they turn on their longitudinal axes and spread the feet and are held in supporting position by the engagement of the friction-roller with the pin connected to the spring.

In testimony whereof I have signed this specification in the presence of two subscribing witnesses.

PAUL PERSON.

Witnesses:
JACK DONAHUE,
GEORGE BROWN.